(12) United States Patent
Yasooka

(10) Patent No.: US 10,014,533 B2
(45) Date of Patent: Jul. 3, 2018

(54) BATTERY PRESSING DEVICE AND BATTERY PRESSING METHOD

(71) Applicants: Nissan Motor Co., Ltd., Yokohama-shi, Kanagawa (JP); Automotive Energy Supply Corporation, Zama-shi, Kanagawa (JP)

(72) Inventor: Takeshi Yasooka, Yamato (JP)

(73) Assignees: Nissan Motor Co., Ltd., Yokohama (JP); Automotive Energy Supply Corporation, Zama (JP)

( * ) Notice: Subject to any disclaimer, the term of this patent is extended or adjusted under 35 U.S.C. 154(b) by 150 days.

(21) Appl. No.: 14/370,616

(22) PCT Filed: Feb. 13, 2013

(86) PCT No.: PCT/JP2013/053379
§ 371 (c)(1),
(2) Date: Jul. 3, 2014

(87) PCT Pub. No.: WO2013/122095
PCT Pub. Date: Aug. 22, 2013

(65) Prior Publication Data
US 2015/0000116 A1 Jan. 1, 2015

(30) Foreign Application Priority Data

Feb. 13, 2012 (JP) ................. 2012-028497

(51) Int. Cl.
*B30B 3/04* (2006.01)
*H01M 6/00* (2006.01)
*H01M 10/04* (2006.01)

(52) U.S. Cl.
CPC ............... *H01M 6/005* (2013.01); *B30B 3/04* (2013.01); *H01M 10/0404* (2013.01); *Y10T 29/49108* (2015.01); *Y10T 29/53135* (2015.01)

(58) Field of Classification Search
None
See application file for complete search history.

(56) References Cited

U.S. PATENT DOCUMENTS 5,904,804 A * 5/1999 Kouda ................. B29C 63/06
156/540
6,024,533 A * 2/2000 Redden ................. B65H 5/20
271/150
2001/0036573 A1 11/2001 Jen et al.

FOREIGN PATENT DOCUMENTS

CN 2766352 Y 3/2006
CN 101202365 A 6/2008
(Continued)

OTHER PUBLICATIONS

Kim—kr100874386b1—Original and English translation.*
Kim—KR 100874386 B1—professional translation.*

*Primary Examiner* — Sarah A. Slifka
*Assistant Examiner* — Haroon S. Sheikh
(74) *Attorney, Agent, or Firm* — Global IP Counselors, LLP

(57) ABSTRACT

A battery pressing device includes a roller and a transport device. The roller is configured to rotate at a rotational speed when pressing a battery cell in which is disposed a battery element having electrodes and separators layered inside an external packaging. The transport mechanism is configured to transport the battery cell at a transport speed that is synchronized with the rotational speed of the roller when the battery cell is being pressed by the roller.

6 Claims, 8 Drawing Sheets

(56) References Cited

FOREIGN PATENT DOCUMENTS

| | | |
|---|---|---|
| JP | 11-67227 A | 3/1999 |
| JP | 11-67234 A | 3/1999 |
| JP | 2002-151156 A | 5/2002 |
| KR | 100874386 b1 * | 12/2008 |

* cited by examiner

BATTERY PRESSING DEVICE AND BATTERY PRESSING METHOD

CROSS-REFERENCE TO RELATED APPLICATIONS

This application is a U.S. National stage application of International Application No. PCT/JP2013/053379, filed Feb. 13, 2013, which claims priority to Japanese Patent Application No. 2012-028497 filed in Japan on Feb. 13, 2012, the contents of each of which are hereby incorporated herein by reference.

BACKGROUND

Field of the Invention

The present invention relates to a battery pressing device and a battery pressing method.

Background Information

In recent years, battery cells have been used in various products. With battery cells, a battery element in which positive electrodes, separators, and negative electrodes are layered is disposed in an external packaging. The battery element is immersed in an electrolyte inside the external packaging, and power is generated by a chemical reaction.

In the process whereby such battery cells are manufactured, the electrolyte is infused into the external packaging with the battery element disposed inside the external packaging. The electrolyte progressively impregnates the interior of the battery element starting from the periphery. For this reason, air remains on the interior of the battery element in some cases.

In addition, after infusion of the electrolyte, some of the electrolyte becomes gas due to the chemical reaction and can accumulate inside the battery element in some cases.

Thus, a known method is to heighten electrolyte impregnation by roller-pressing the battery cell in order to press out the gas on the interior of the battery element (refer to Japanese Laid-Open Patent Application No. 2002-151156).

SUMMARY

However, Japanese Laid-Open Patent Application No. 2002-151156 discloses pressing the battery element with a pair of rollers, but does not disclose that the battery cell is simply inserted between the rotating rollers during pressing. With common roller-pressing, the work approaches the rollers slowly, and then the work is drawn in by the rollers.

Thus, when the battery cell is inserted between the rollers, the insertion speed of the battery cell and the rotational speed of the rollers are different, and a speed differential arises between the speed at which the rollers pass the battery cell surface and the speed at which the battery cell as a whole is transported. By virtue of this differential, unbalanced forces act on the battery element that is layered inside the battery cell, and layer shifting arises.

The present invention was developed in view of the foregoing, accordingly an object of the invention to provide a battery press device and battery press method whereby it is possible to prevent layer shifting when a battery cell is roller-pressed.

The present invention was developed in view of the foregoing, accordingly an object of the invention is to provide a battery press device and battery press method whereby a battery cell can be roller-pressed without layer shifting.

The battery press device has rollers and a transport device or mechanism. The rollers rotate while pressing a battery cell in which is disposed a battery element having electrodes and separators layered in an external packaging. The transport device or mechanism transports the battery cell at a speed synchronized with the rotational speed of the rollers when the battery cell is pressed by the rollers.

The battery pressing method is a battery pressing method for pressing a battery cell in which is disposed a battery element having electrodes and separators layered in an external packaging. The battery pressing method includes a step in which the battery cell is pressed by the rotating rollers and a step in which the battery cell is transported by a transport device at a speed synchronized with the rotational speed of the rollers when the battery cell is pressed by the rollers.

According to the battery pressing method, the rotational speed of the rotational pressing device and the transport speed of the battery cell are synchronized, and so a differential does not arise between the surface of the battery cell and the battery cell as a whole when pressing is initiated by the rotational pressing device. Unbalanced forces thus do not act on the battery element inside the battery cell. As a result, layer shifting of the battery element inside the battery cell does not arise, and the cell can be pressed to eliminate gas, air, and the like inside the battery element, with electrolyte impregnating the battery element in its place.

BRIEF DESCRIPTION OF THE DRAWINGS

Referring now to the attached drawings which form a part of this original disclosure.

DETAILED DESCRIPTION OF THE EMBODIMENTS

Figure 1:
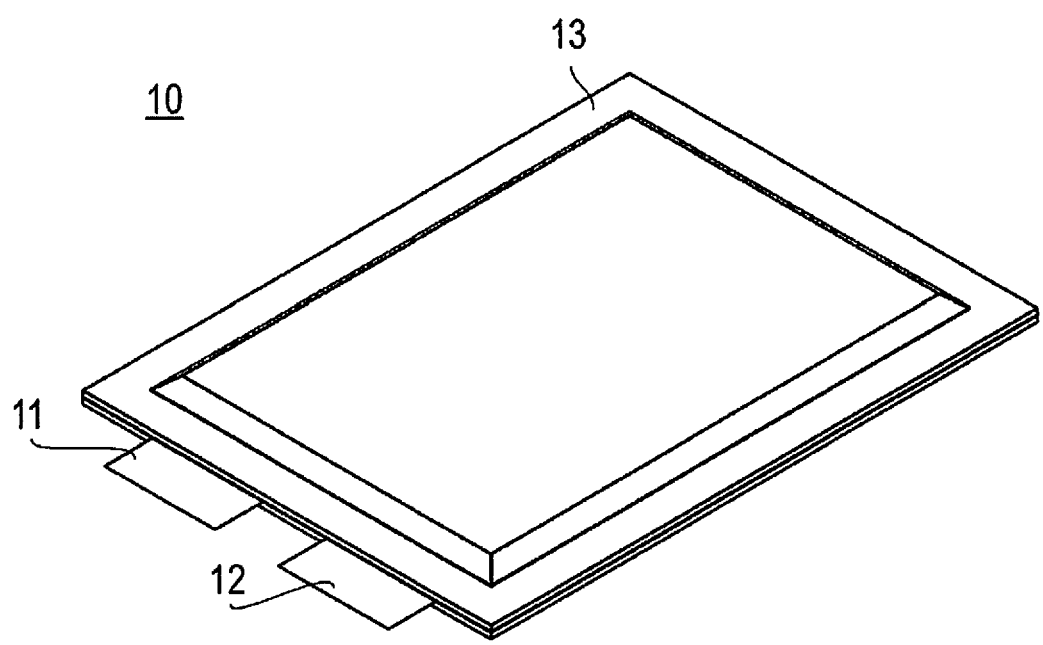
FIG. 1 is a perspective view showing the exterior of the battery cell.

Embodiments of the present invention are described below with reference to the accompanying drawings. In the descriptions of the drawings, the same symbols refer to the same elements, and duplicate descriptions are thus not made. The dimensional ratios in the drawings may be exaggerated in order to aid in description and thus may differ from the true ratios in some instances.

The present invention relates to a battery pressing device and battery pressing method whereby a battery cell is pressed in order to press out gasses inside the battery element of the battery cell. The structure of a battery that is to be pressed will be described prior to describing the battery pressing device and battery pressing method.

(Battery)

Figures 2A, 2B:
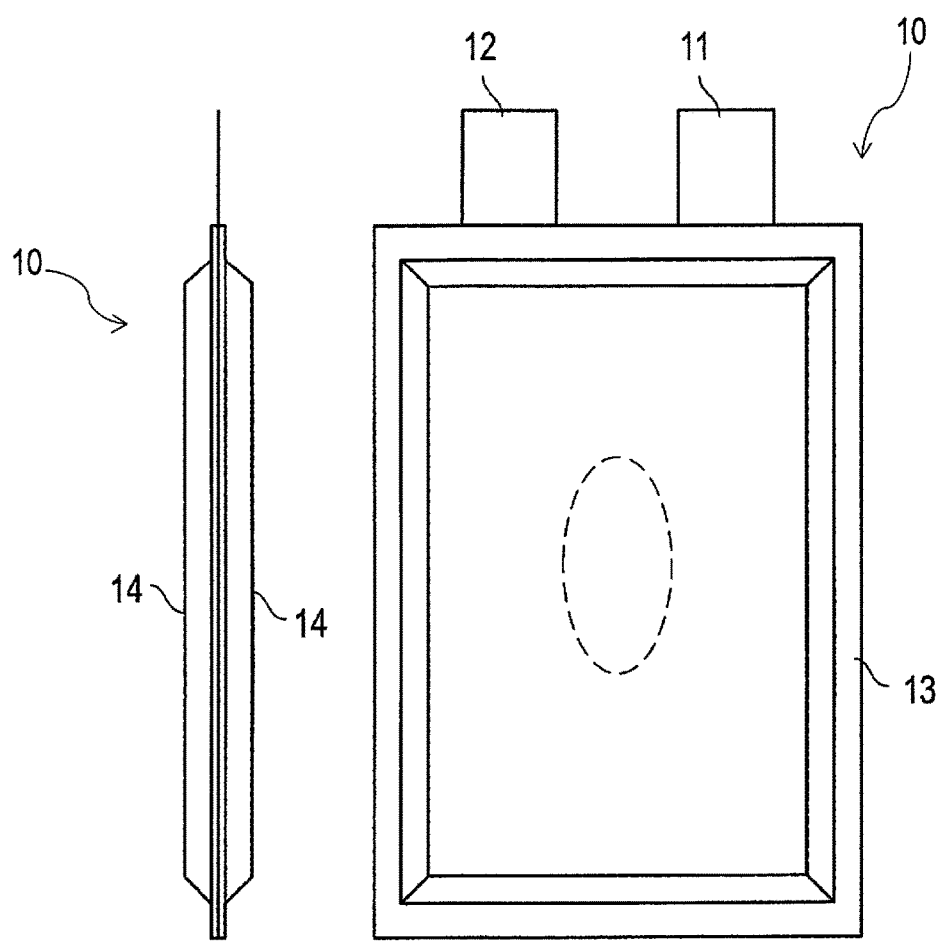
FIGS. 2A and 2B are diagrams showing a plan view and side view of the battery cell.
Figure 3:
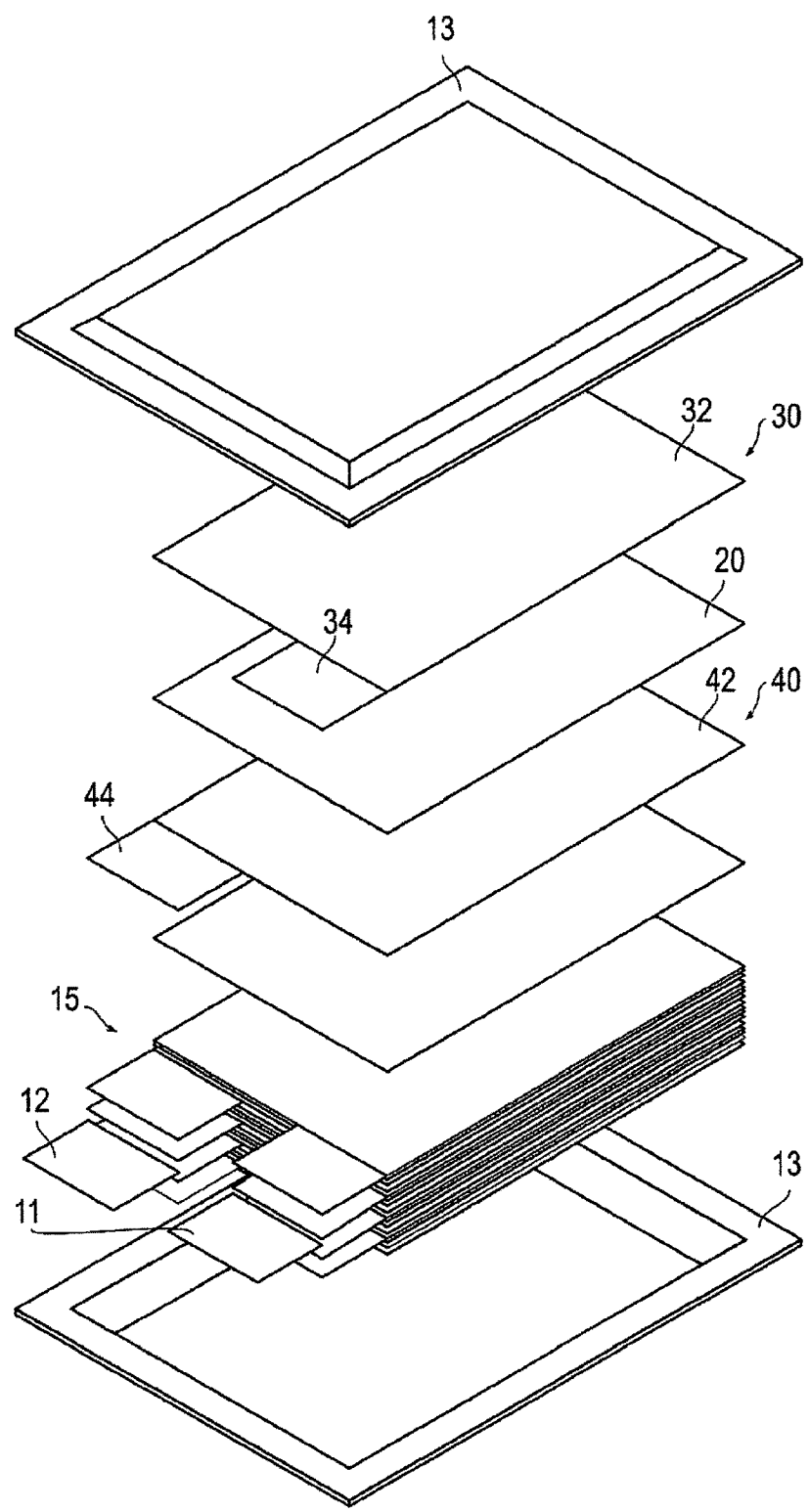
FIG. 3 is an exploded perspective view of the battery cell.

FIG. 1 is a perspective view showing the exterior of a battery cell. FIGS. 2A and 2B are diagrams showing a plan view and side view of the battery cell. FIG. 3 is an exploded perspective view of the battery cell.

As shown in FIG. 1, FIG. 2A and FIG. 2B, the battery cell 10 has a flattened rectangular shape, with a positive electrode lead 11 and a negative lead 12 exiting from the same end of an external packaging 13. The external packaging 13 is, for example, produced by applying a resin coating to the surface of an aluminum sheet.

As shown in FIG. 3, the interior of the external packaging 13 contains electrolyte and an electricity-generating element (battery element) 15 whereby the charging and discharging reactions occur. The electricity-generating element 15 is formed by alternately layering positive electrodes 30 and negative electrodes 40, with sheet-form separators 20 interposed therebetween. In some cases, air, gas, or the like remains in the battery element 15 (separator 20) after the electricity-generating element 15 has been disposed in the external packaging 13, or after the electrolyte has been added. For example, gas or air remains in the circular region indicated by the dotted line in FIG. 2B.

With positive electrodes 30, a positive active substance layer 32 is formed on both surfaces of a sheet-form positive electrode collector. The positive active substance layer 32 is not formed on tab portions 34 of the positive electrodes 30. The respective tab portions 34 of the positive electrodes 30 are disposed at overlapping positions as seen from the direction of layering of the electricity-generating element 15. The tab portions 34 connect with the positive electrode lead 11.

With the negative electrodes 40, a negative electrode active substance layer 42 is formed on both surfaces of a sheet-form negative electrode collector. The negative active substance layer 42 is not formed on tab portions 44 of the negative electrodes 40. The respective tap portions 44 of the negative electrodes 40 are disposed at overlapping positions as seen from the direction of layering of the electricity-generating element 15 and are disposed so as not to overlap with the tab portions 34 of the positive electrodes 30. The tab portions 44 are connected to a negative electrode lead 12.

A flat surface 14 is formed on both sides of the flattened form of the battery cell 10. Because this flat surface 14 is pressed with a press-roller, the gas or air that has accumulated in the battery element 15 is pressed out from the battery element 15, so that electrolyte impregnates the interior of the battery element 15 in its place.

The battery cleaning device and method are described in detail below.

First Embodiment

Figure 4:
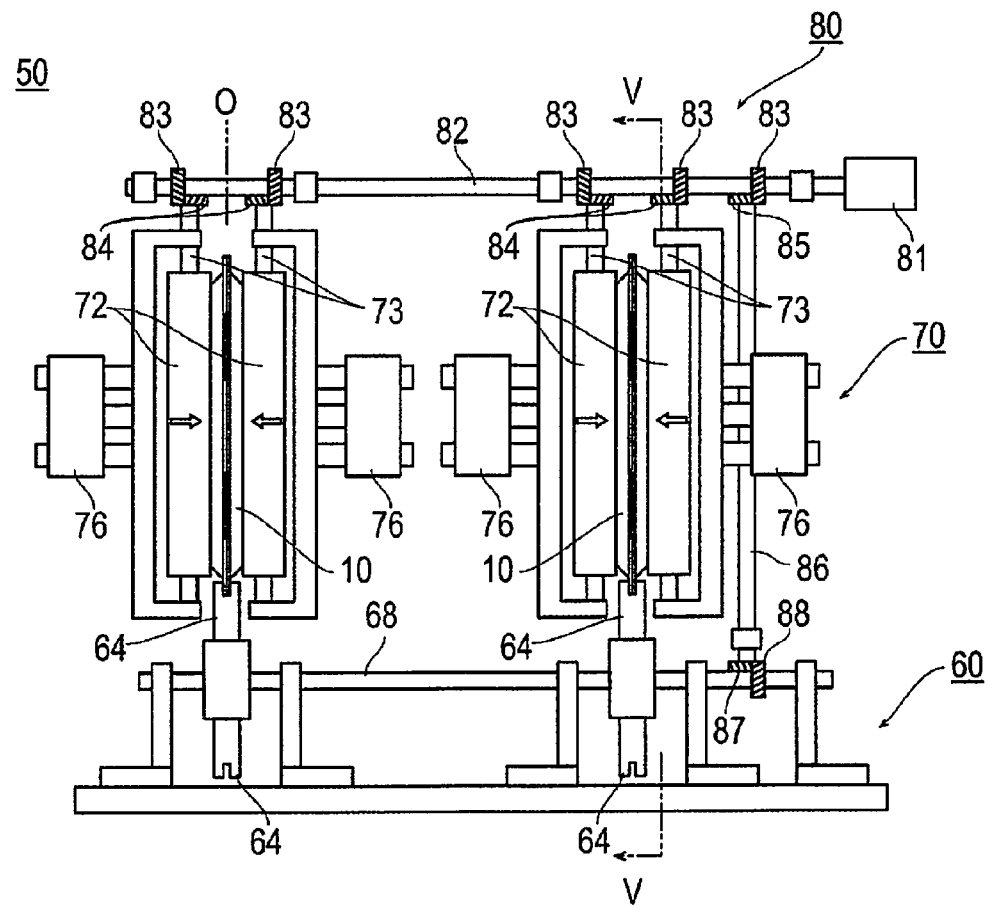
FIG. 4 is a front view showing the elements involved in pressing the battery cell by the battery pressing device.
Figure 5:
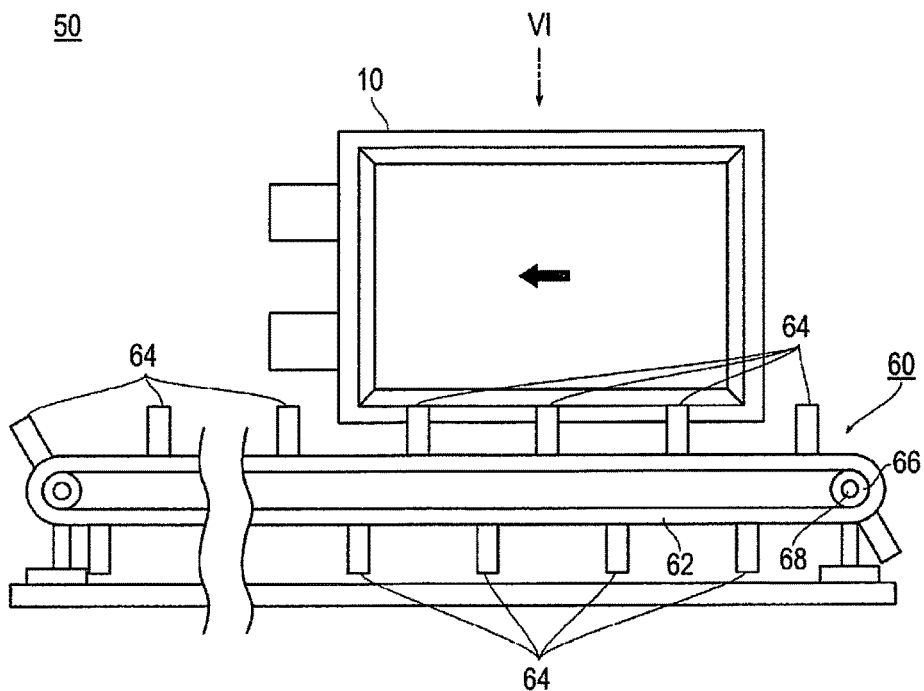
FIG. 5 is a side view showing the battery pressing device as seen from the direction of V-V in FIG. 4.
Figure 6:
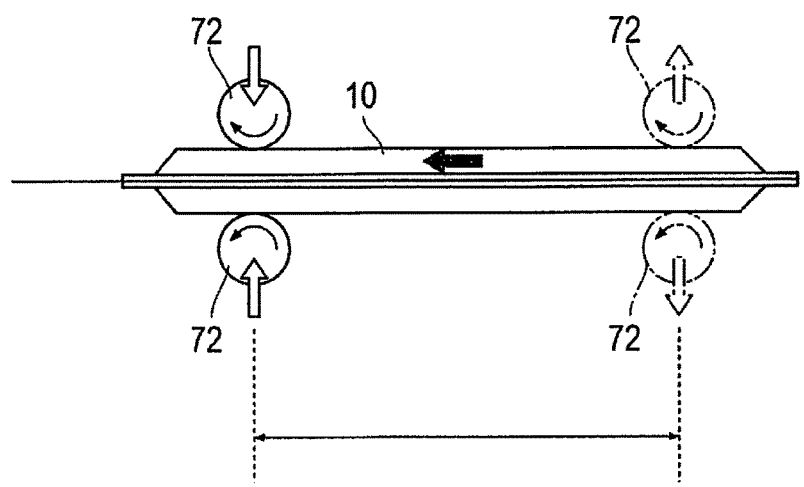
FIG. 6 is a plan view showing the battery pressing device as seen from the direction of VI in FIG. 5.

FIG. 4 is a front view of the elements involved in pressing the battery cell by the battery pressing device. FIG. 5 is a side view showing the battery pressing device as seen from the direction of V-V in FIG. 4. FIG. 6 is a plan view showing the battery pressing device as seen from the direction of VI in FIG. 5.

As shown in FIGS. 4 to 6, the battery pressing device 50 has a transport mechanism 60, a pressing mechanism 70, and a coupling mechanism 80. The respective mechanisms of the transport mechanism 60, the pressing mechanism 70, and the coupling mechanism 80 will be described in sequence below.

The transport mechanism 60 transports a battery cell 10 in a condition where the short edge of the rectangular form is standing vertically. The battery cell 10 is transported into the transport mechanism 60 by another transport device that is not shown in the drawings, e.g., a transport robot whereby the battery cell 10 is transported through the air while suspended.

The transport mechanism 60 has a rotating belt 62 that is formed as a loop, and multiple transport receivers 64 that are arranged on the belt 62. The transport receivers 64 move while sandwiching the bottom edge of the external packaging 13 of the battery cell 10, thereby transporting the battery cells 10. At least two of the transport receivers 54 support the battery cell 10. In addition, a freely-rotating rotational body 66 is disposed on at least one end of the rotating belt 62. The rotating body 66 is attached to a rotating shaft 68 and rotates along with rotation of the rotating shaft 68, transmitting this rotational power to the belt 62. The belt 62 is rotated by the transmitted rotational power. In this embodiment, two assemblies of transport mechanism 60 are disposed so as to operate in tandem. The transport mechanisms 60 may be driven independently, or more than one may be driven together.

The pressing mechanism 70, as shown in FIGS. 4 to 6, has a pair of rollers 72, a support part 74, and a cylinder 76. The pair of rollers 72 pass by the battery cell 10 and press the battery cell 10 from the flat surfaces 14 on both sides. The support part 74 holds a rotating shaft 73 of the roller 72 so that it can freely rotate. The cylinder 76 is attached to the support part 74. Upon the shaft of the cylinder 76 being extended, the rollers 72 approach each other and so that they can press the battery cell 10. Upon the shaft of the cylinder 76 being retracted, the rollers 72 separate from each other, removing pressure on the battery cell 10. With the pressing mechanism 70 of this embodiment, two assemblies are disposed so as to operate in tandem, as with the transport mechanism 60.

The coupling mechanism 80 mechanically couples the transport mechanism 60 and the pressing mechanism 70. The coupling mechanism 80, as shown in FIG. 4, has a motor 81, a rotating shaft 82, gears 83 to 85, a driven shaft 86, a gear 87, and a gear 88.

The motor 81 generates rotational power causing the rotating shaft 82 to rotate. The rotating shaft 82 transmits the rotational power of the motor 81. Multiple gears 83 are provided, attached to the rotating shaft 82. A gear 84 is attached to the rotating shaft 73 of the roller 72 of the pressing mechanism 70 and engages with the teeth of the gear 83, thereby constituting a screw gear. The gear 83 and gear 84 that constitute the screw gear are provided so that the pair of rollers 72 that press a single battery cell 10 rotate symmetrically with respect to the battery cell 10 as shown in FIG. 6. In other words, the assembly of the gear 83 and the gear 84 that constitute the screw gear are disposed so that they are mirror images with respect to plane O passing through the middle of the battery cell 10 as shown in FIG. 4.

Returning to FIG. 4, the gear 85 constitutes a separate screw gear by meshing with one of the gears 83. The gear 85 is attached to the driven shaft 86, and the gear 87 is attached to the driven shaft 86. The gear 88 meshes with the gear 87, constituting a screw gear. The gear 88 also is attached to the rotating shaft 68 of the transport mechanism 60. The gear 87 and the gear 88 are thus provided so that the direction in which the battery cell 10 passes due to rotation of the rollers 72 is the same as the direction that the battery cell 10 is transported by advancement of the belt 62 due to rotation of the rotating shaft 68.

The battery pressing device 50 has a configuration in which rotation of the roller 72 and transport of the battery cell 10 are mechanically coupled to the driving of the motor 81. In particular, the battery pressing device 50 has a configuration in which the rotational speed of the rollers 72 of the pressing mechanism 70 is synchronous with the transport speed of the battery cell 10 produced by the transport mechanism 60. Specifically, the gear ratios of the gears 83 to 85, 87, and 88 are calculated and provided in the battery pressing device 50 so that the speed of the rollers 72 in the tangential direction (tangential speed) matches the transport speed of the battery cell 10.

In this embodiment, the position of the rollers 72 is adjusted by the cylinder 76. When the position of the rollers 72 is adjusted, the position of the rotating shaft 73 also moves, and the position of the gear 84 relative to the gear 83 changes. Consequently, with the cylinder 76, the position of the roller 72 is adjusted by a stroke whereby the gears 83 and 84 do not disengage.

(Operation)

The operation of the battery pressing device 50 is described below.

With the battery pressing device 50, the motor 81 is driven when the battery cell 10 is transported into the transport mechanism 60. The motor 81 brings about rotation of the rotating shaft 82 in a fixed direction. The gear 83 moves along with rotation of the rotating shaft 82, and the gear 85 that constitutes a screw gear along with the gear 83 is also driven. The driven shaft 86 to which the gear 85 is attached thus also rotates, and the gear 87 rotates as well. The gear 88 that constitutes a screw gear along with the gear 87 is driven, and the rotating shaft 68 thus rotates. The belt 62 rotates along with rotation of the rotating shaft 68, and the battery cell 10 is transported in the direction indicated by the black arrow in FIGS. 5 and 6.

The battery pressing device 50 brings about pressing of the battery cell 10 with the rollers 72 by the cylinder 76 when the battery cell 10 is transported into the pressing step by the rollers 72. The motor 81 is already being driven for transport of the battery cell 10 by the transport mechanism 60, and so the motor 81 brings about rotation of the rotating shaft 82 in a fixed direction. The gear 83 rotates along with rotation of the rotating shaft 82, and the gear 84 that constitutes a screw gear along with the gear 83 is also driven. The rotating shaft 73 to which the gear 84 is attached thus rotates, and the roller 72 also rotates. In this embodiment, the drive power of the motor 81 is mechanically transmitted to the transport mechanism 60 and the pressing mechanism 70, and the entire configuration is synchronously coupled together.

As described above, with the battery pressing device 50, the transport mechanism 60 that transports the battery cell 10 and the pressing mechanism 70 that presses the battery cell 10 are mechanically coupled by a coupling mechanism 80. In particular, the rollers 72 rotate, and the transport receivers 64 transport the battery cell 10 as a result of power from the motor 81. Because the rotational speed of the rollers 72 and the transport speed of the battery cell 10 are synchronized, no differential rises between the speed at which the rollers 72 pass by the surfaces of the battery cell 10 and the speed at which the transport receivers 64 transport the battery cell 10 as a whole when pressing is initiated by the rollers 72. Consequently, unbalanced forces do not act on the battery element 15 inside the battery cell, and the pressing forces act perpendicularly with respect to the layering direction of the battery element 15. As a result, the battery cell 10 is pressed without layer shift of the battery element 15 inside the battery cell 10, and gas, air, and the like inside the battery element 15 can be removed, allowing electrolyte to impregnate the interior of the battery element 15 instead.

In addition, in accordance with the battery pressing device 50, mechanical synchronization of the transport mechanism 60 and the pressing mechanism 70 is brought about by the coupling mechanism 80, and so transport of the battery cell 10 and rotation of the rollers 72 can be simultaneously ensured. For example, even if a line is suddenly stopped, rotation of the rollers 72 and transport are simultaneously stopped. Consequently, a time differential does not arise due to stoppage, and no layer shift arises due to unbalanced forces acting on the battery element 15.

In the embodiment described above, the battery cell 10 was pressed from both surfaces by a pair of rollers 72, but because the rotational speed of the rollers 72 is synchronized with the transport speed of the battery cell 10, no speed differential arises in the roller 72, and layer shift does not arise due to unbalanced forces acting on the battery element 15 depending on the rotational speed of the roller 72.

The transport receivers 64 of the transport mechanism 60 transport the cell while holding the edge of the absorbing body 13 without sandwiching the battery element 15. Consequently, the transport mechanism 60 is not impeded when the battery element 15 is pressed by the rollers 72 from both surfaces.

In Embodiment 1, the timing of initiation of pressing of the battery cell 10 and the timing of determining that the pressing step has been entered can be achieved, for example, by attaching markers to the electrode leads 11, 12 of the battery cell 10. By detection of the markers with a sensor, the position of the battery cell 10 can be detected, and pressing can be initiated from the position at which pressing is possible by the rollers 72. For example, as indicated by the solid line in FIG. 6, pressing is initiated when the leading edge in the transport direction of the flat surface 14 of the battery cell 10 arrives at the position of the rollers 72. Transport of the battery cell 10 progresses, and when the battery cell 10 advances to the position indicated by the dotted line in the figure, the pressing of the rollers 72 is released.

Second Embodiment

In the first embodiment, a configuration was described in which both surfaces are pressed by the rollers 72, with the battery cell 10 transported in a standing state. In the second embodiment, a configuration will be described in which the roller is pressed on one face, with the battery cell 10 carried on a transport stand.

Figure 7:
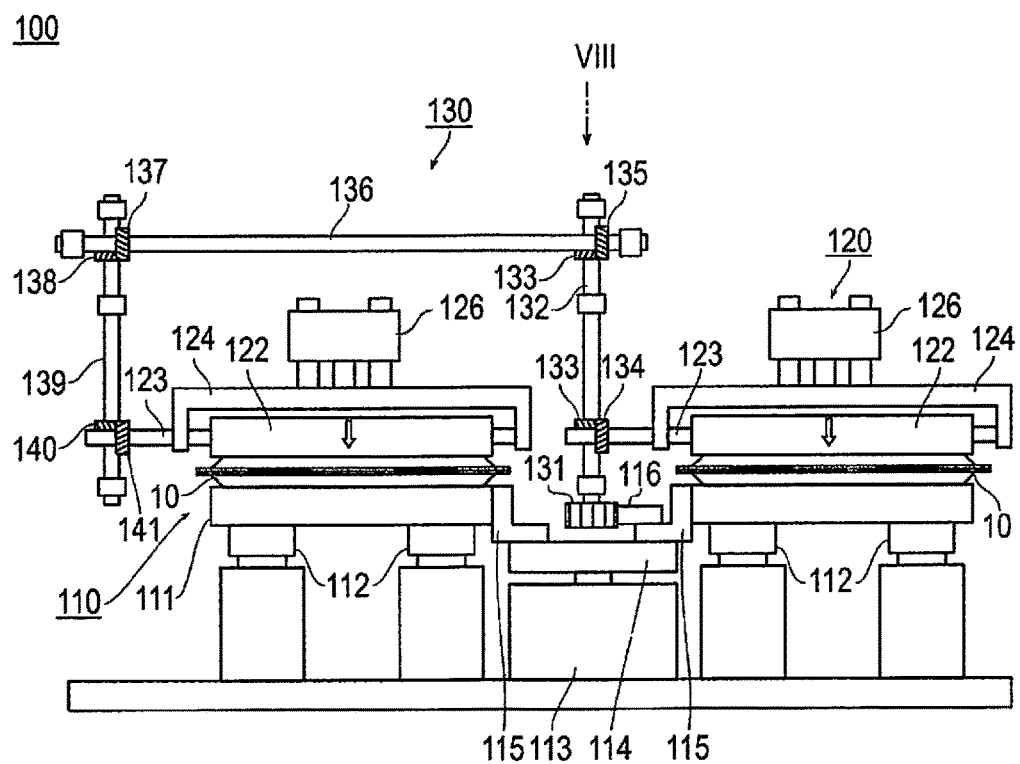
FIG. 7 is a front view showing the elements involved in pressing the battery by the battery pressing device in a second embodiment.
Figure 8:
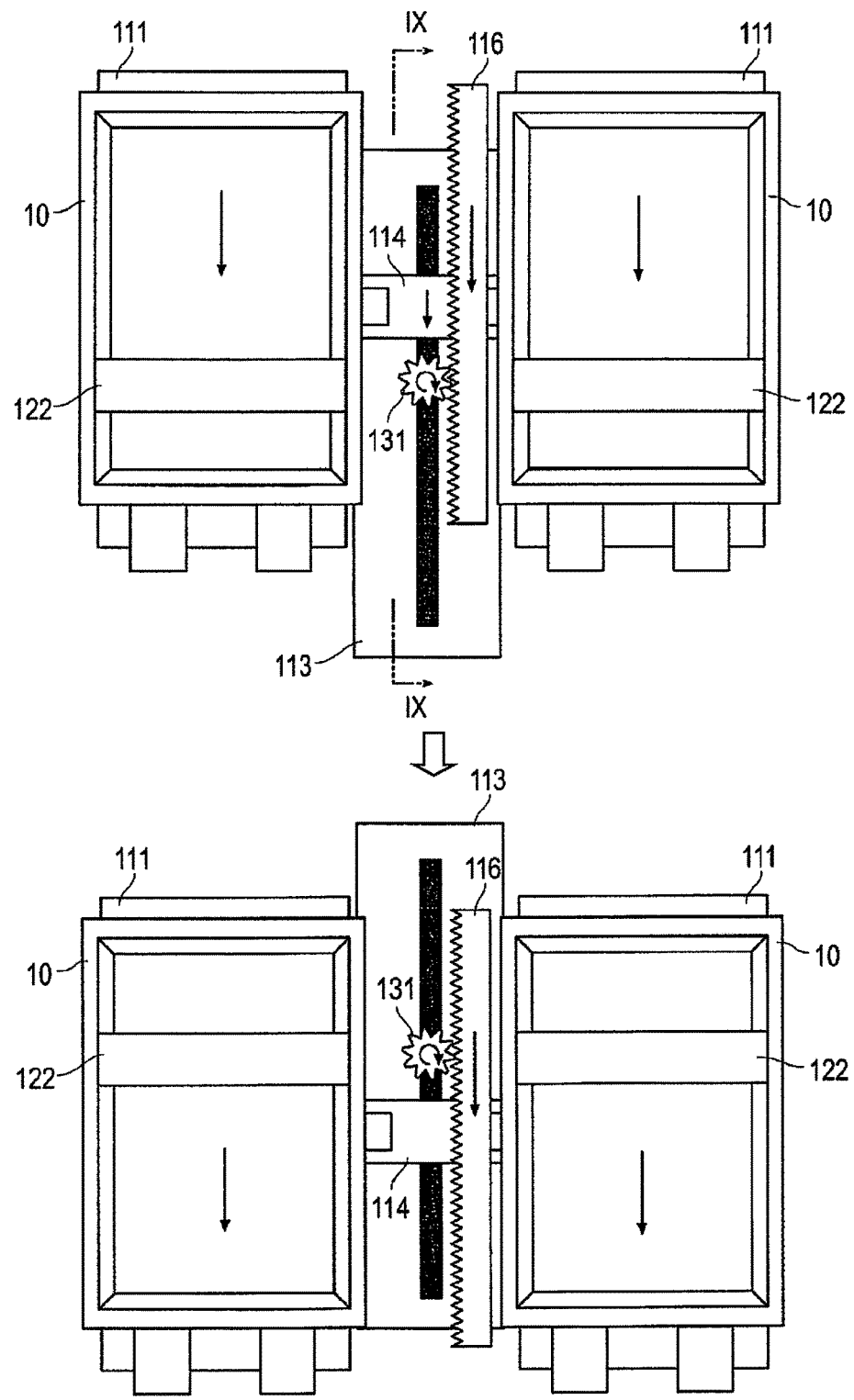
FIG. 8 is a plan view showing the battery pressing device as seen from the direction of VIII in FIG. 7.
Figure 9:
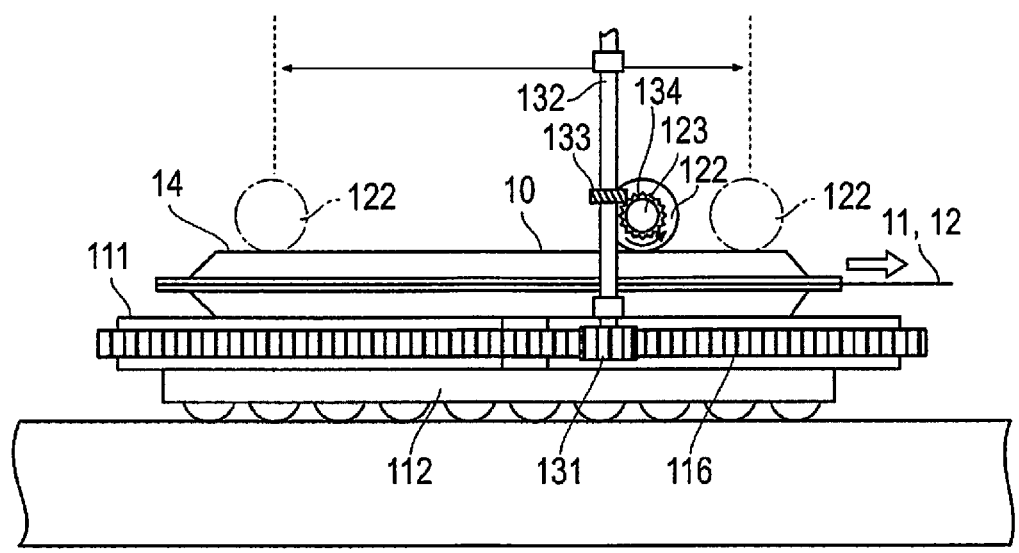
FIG. 9 is a side view showing the battery pressing device as seen from the direction of IX in FIG. 8.

FIG. 7 is a front view showing the elements that are involved in pressing the battery by the battery pressing device of the second embodiment. FIG. 8 is a plan view of the battery pressing device viewed from the direction of VIII in FIG. 7. FIG. 9 is a side view showing the battery pressing device seen from the direction of IX in FIG. 8. In FIG. 9, the support part that supports the rollers is not shown.

As shown in FIGS. 7 to 9, the battery pressing device 100 has a transport mechanism 110, a pressing mechanism 120, and a coupling mechanism 130. The configurations of the transport mechanism 110, the pressing mechanism 120, and the coupling mechanism 130 will be described sequentially below.

The transport mechanism 110 has a transport stand 111, an LM guide 112, a slide device 113, a moving plate 114, a mounting 115, and a rack 116. The transport stand 111 is a stand for carrying the battery cell 10. The LM guide 112 having multiple wheels is provided in a lower part of the transport stand 111. The LM guide 112 moves the transport stand 111 in a straight line. A track can be provided in a lower part of the LM guide 112 in order to prevent derailment. Two transport stands 111 may be provided, with each of the two transport stands 111 able to transport a battery cell 10.

The slide device 113 is disposed between the transport stands 111. The slide device 113 is a device that moves the moving plate 114 that is provided on the upper part of the slide device 113 in a direction extending from the slide device 113. With the slide device 113, a servo motor, for example, is mounted in a box. The servo motor has a rotating shaft that extends inside the box, and the moving plate 114 is attached to the rotating shaft. External threading is formed on the surface of the rotating shaft and threads together with internal threading that is formed in the moving plate 114, so that the moving plate 114 advances due to a feed screw mechanism along with rotation of the of the rotating shaft of the servo motor. For example, a moving plate 114 moves in the direction indicated by the arrow of FIG. 8.

A mounting 115 is provided between the transport stand 111 and the moving plate 114. The mounting 115 brings about movement of the transport stand 111 along with movement of the moving plate 114. A rack 116 in which teeth are formed on a side face of a flat plate is also attached to the mounting 115.

The pressing mechanism 120, as shown in FIGS. 7 to 9, has a roller 122, a support part 124, and a cylinder 126. The roller 122 can press the battery cell 10 that is carried on the transport stand 111 in the direction of the transport stand 111. The support part 124 holds the rotating shaft 123 of the roller 122 so that it can rotate freely. The cylinder 126 is attached to the support part 124. Through extension of the shaft of the cylinder 126, the roller 122 is brought close to the transport stand 111, and the battery cell 10 can be pressed. Through retraction of the shaft of the cylinder 126, the roller 122 is separated from the transport stand 111, and pressing on the battery cell 10 is released. For the pressing mechanism 120 in this embodiment, two assemblies are arranged so as to operate in concert, in the same manner as with the transport mechanism 110.

The coupling mechanism 130 mechanically links the transport mechanism 110 and the pressing mechanism 120. The coupling mechanism 130, as shown in FIG. 7, has a pinion 131, a main shaft 132, gears 133 to 135, a first driven shaft 136, gears 137, 138, a second driven shaft 139, and gears 140, 141.

The pinion 131, as shown in FIGS. 7 to 9, meshes with the rack 116. The pinion 131 is attached to the main shaft 132. Numerous gears 133 are also attached to the main shaft 132. One of these numerous gears 133 constitutes a screw gear by meshing with the gear 134 that is attached to the rotating shaft 123 of the roller 122. Because a screw gear is thereby constituted, the rotational power of the pinion 131 is transferred to the rotating shaft 123 of one of the two assemblies of rollers 122 (middle right, in FIG. 7) via the gears 133, 134, and the roller 122 rotates. The gears 133, 134 are provided so that the direction in which the battery cell 10 advances through rotation of the roller 122 matches the direction in which the transport table 111 of the transport mechanism 110 transports the battery cell 10.

In addition, the other gear 133 that is attached to the main shaft 132 constitutes a screw gear by meshing with the gear 135. The gear 135 is attached to the driven shaft 136. Another gear 137 is provided on the driven shaft 136, and the gear 137 constitutes a screw gear by meshing with the gear 138. The gear 138 is attached to a second driven shaft 139. Another gear 140 is attached to the second driven shaft 139, and the gear 140 constitutes a screw gear together with the gear 141 that is attached to the rotating shaft 123 of the other roller 122. In this manner, the rotational power of the pinion 131 is transmitted to the rotating shaft 123 of the other roller 122 (middle left in FIG. 7) via the numerous gears 133, 135, 137, 138, 140, 141, the first driven shaft 136, and the second driven shaft 139, and the roller 122 rotates. The gears 133, 135, 137, 138, 140, and 141 are provided so that the direction in which the battery cell 10 advances due to rotation or the roller 122 matches with the direction in which the transport table 111 of the transport mechanism 110 transports the battery cell 10.

As described above, the battery pressing device 100 is configured so that transport of the battery cell 10 and rotation of the roller 122 are mechanically coupled to driving of the slide device 113. In particular, the battery pressing device 100 is configured so that the tangential speed of the roller 122 of the pressing mechanism 120 is synchronous with the transport speed of the battery cell 10 produced by the transport mechanism 110. Specifically, the gear ratios of the gears 83, 85, 87, and 88 are calculated and provided on the battery pressing device 50 so that the tangential speed of the roller 72 matches the transport speed of the battery cell 10.

In this embodiment, the position of the roller 122 was adjusted by the cylinder 126. When the position of the roller 122 is adjusted, the position of the rotating shaft 123 also moves, and the positions of the gears 134, 141 change relative to the gears 133, 140. Consequently, the cylinder 126 adjusts the position of the roller 122 over a stroke whereby the meshing of the gears 134, 141, 133, and 140 is not exceeded.

(Operation)

The operation of the battery pressing device 100 is described below.

With the battery pressing device 100, the battery cell 10 is placed on the transport stand 111, and transport of the battery cell 10 by the transport mechanism 110 is initiated. For example, the moving plate 114 is moved by the slide device 113, and the transport stand 111 is made to travel in conjunction therewith in the same direction as the moving plate 114. The rack 116 also travels along with travel of the moving plate 114, and the pinion 131 that is meshed with the rack 116 rotates. When the pinion 131 rotates, the roller 122 rotates via the main shaft 132 and the gears 133, 134, or via the main shaft 132, the first driven shaft 136, the second driven shaft 139, and the gears 133, 135, 137, 138, 140, and 141.

When the battery cell 10 is transported into the pressing step involving the roller 72 as shown in FIG. 8, the battery pressing device 100 causes the roller 122 to press on the battery cell 10 via the cylinder 126. As described above, the roller 122 also is already rotating along with transport of the battery cell 10. Consequently, as shown in FIG. 9, the advancement direction of the battery cell 10 due to the roller 122 and the transport direction of the battery cell 10 due to the transport stand 111 are matched at the point when pressing of the battery cell 10 is initiated. In addition, the rotational speed of the roller 122 of the pressing mechanism 120 is synchronized with the transport speed of the battery cell 10 by the transport mechanism 110. As shown in FIG. 8, pressing of the battery cell 10 progresses with advancement of transport of the battery cell 10. Pressing of the battery cell 10, for example, is carried out in the range of the roller 122 indicated by the broken lines in FIG. 9.

As described above, with the battery pressing device 100, the transport mechanism 110 that transports the battery cell 10 and the pressing mechanism 120 that presses the battery cell 10 are mechanically coupled by the coupling mechanism 130. In particular, as a result of sliding power of the moving plate 114 due to the slide device 113, the transport stand 111 transports the battery cell 10, and the roller 122 rotates. Because the rotational speed of the roller 122 is synchronized with the transport speed of the battery cell 10, a differential in speed does not arise between the speed at which the roller 122 passes the surface of the battery cell 10 and the speed at which the transport stand 111 transports the battery cell 10 as a whole when pressing is initiated by the roller 122. Consequently, unbalanced forces do not act on the battery element 15 in the battery cell 10, and press forces act vertically in the direction of layering of the battery element 15. As a result, the battery cell 10 is pressed without layer shifting of the battery element 15 in the battery cell 10, and gas, air, and the like inside the battery element 15 can be removed, with electrolyte impregnating the interior of the battery element 15 in its place.

In addition, with the battery pressing device 100, because the transport mechanism 110 and the pressing mechanism 120 are mechanically synchronized by the coupling mechanism 130, rotation of the roller 122 and transport of the battery cell 10 can be reliably synchronized. For example, even if the line is suddenly stopped, rotation of the roller 112 and transport are simultaneously stopped. Consequently, a time differential does not arise due to stoppage, and no layer shifting arises due to unbalanced forces acting on the battery element 15.

Because the battery cell 10 is transported by the transport stand 111, transport can be carried out in a more stabilized state than when the battery cell 10 is transported while standing.

In Embodiment 2 above, the timing of initiation of pressing of the battery cell 10 and the timing of determining that the pressing step has been entered can be achieved, for example, by attaching markers to the electrode leads 11, 12 of the battery cell 10. By detection of the markers with a sensor, the position of the battery cell 10 can be detected, and pressing can be initiated from the position at which pressing is possible by the rollers 72.

In the first and second embodiments described above, examples of structures and methods were described in which the transport speed of the battery cell 10 and the rotational speed (tangential speed) of the rollers were mechanically synchronized. However, the present invention is not restricted, and any configuration may be used whereby the transport speed of the battery cell 10 and the rotational speed of the rollers can be synchronized.

The invention claimed is:

1. A battery pressing device comprising:
    a pair of rollers configured to rotate at a rotational speed around a vertical rotating shaft when pressing a battery cell in which is disposed a battery element having electrodes and separators layered inside an external packaging;
    a driving unit configured to rotate the pair of rollers; and
    a transport mechanism configured to transport the battery cell in a vertically standing state at a transport speed that-matches a tangential speed of the pair of rollers,
    wherein the battery cell is pressed by sandwiching the battery cell in the vertically standing state between the pair of rollers.

2. The battery pressing device according to claim 1, wherein
    the transport mechanism and the pair of rollers are mechanically synchronized.

3. The battery pressing device according to claim 1, wherein
    the rotational speed of the pair of rollers is synchronized with the transport speed of the battery cell.

4. The battery pressing device according to claim 3, wherein
    the transport mechanism is configured to transport the battery cell by holding an edge of the external packaging without sandwiching the battery element.

5. A battery pressing method for pressing a battery cell in which is disposed a battery element having electrodes and separators layered in an external packaging, the battery pressing method comprising:
    pressing the battery cell by sandwiching the battery cell in a vertically standing state between a pair of rollers which rotate around a vertical rotating shaft at a rotational speed; and
    transporting the battery cell in the vertically standing state by a transport mechanism at a speed that matches a tangential speed of the pair of rollers.

6. The battery pressing method according to claim 5, further comprising
    mechanically synchronizing the transport mechanism and the pair of rollers.

\* \* \* \* \*